United States Patent
Yokota et al.

(10) Patent No.: US 10,562,988 B2
(45) Date of Patent: Feb. 18, 2020

(54) METHOD FOR PRODUCING POLYOLEFIN

(71) Applicant: IDEMITSU KOSAN CO., LTD., Chiyoda-ku (JP)

(72) Inventors: Tatsuyoshi Yokota, Kisarazu (JP); Shinji Miyamoto, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 130 days.

(21) Appl. No.: 15/739,384

(22) PCT Filed: Jun. 27, 2016

(86) PCT No.: PCT/JP2016/068993
§ 371 (c)(1),
(2) Date: Dec. 22, 2017

(87) PCT Pub. No.: WO2017/002756
PCT Pub. Date: Jan. 5, 2017

(65) Prior Publication Data
US 2019/0135952 A1    May 9, 2019

(30) Foreign Application Priority Data
Jun. 29, 2015    (JP) .................. 2015-130250

(51) Int. Cl.
*C08F 6/02* (2006.01)
*C08K 3/014* (2018.01)
(Continued)

(52) U.S. Cl.
CPC ............... *C08F 6/02* (2013.01); *C08F 6/003* (2013.01); *C08J 3/201* (2013.01); *C08K 3/014* (2018.01); *C08K 5/005* (2013.01); *C08J 2323/12* (2013.01)

(58) Field of Classification Search
CPC . C08F 6/02; C08F 6/003; C08K 3/014; C08K 5/005; C08J 3/201
See application file for complete search history.

(56) References Cited

U.S. PATENT DOCUMENTS 5,109,056 A    4/1992  Fukui et al.
5,804,676 A *  9/1998  Hieda ................. B01J 19/1862
                                                    526/65

(Continued)

FOREIGN PATENT DOCUMENTS

JP    2-80433 A       3/1990
JP    2001-316417 A   11/2001
(Continued)

OTHER PUBLICATIONS

International Search Report dated Sep. 20, 2016, in PCT/JP2016/068993 filed Jun. 27, 2016.

*Primary Examiner* — Catherine S Branch
(74) *Attorney, Agent, or Firm* — Oblon, McClelland, Maier & Neustadt, L.L.P.

(57) ABSTRACT

Disclosed is a method for producing a polyolefin including: (1) a step (1) of polymerizing one or more olefins in solution polymerization or slurry polymerization in the presence of a polymerization catalyst to produce a polymer solution, (2) a step (2) of taking out the polymer solution obtained in the step (1), and adding a catalyst deactivator in the polymer solution to deactivate the polymerization catalyst, and (3) a step (3) of removing volatile components in vacuum from the polymer solution where the polymerization catalyst has been deactivated, and including, between the step (2) and the step (3), a step of adding an additive to the polymer solution when the water concentration in the polymer solution is 5 ppm by mass or less.

9 Claims, 1 Drawing Sheet

(51) Int. Cl.
*C08J 3/02* (2006.01)
*C08J 3/20* (2006.01)
*C08F 6/00* (2006.01)
*C08K 5/00* (2006.01)

(56) References Cited

U.S. PATENT DOCUMENTS

2009/0209719 A1* 8/2009 Vanspeybroeck ......... C08F 6/02
526/348
2011/0263807 A1 10/2011 Spataro et al.

FOREIGN PATENT DOCUMENTS

| | | |
|---|---|---|
| JP | 2005-530915 A | 10/2005 |
| JP | 2012-511590 A | 5/2012 |

* cited by examiner

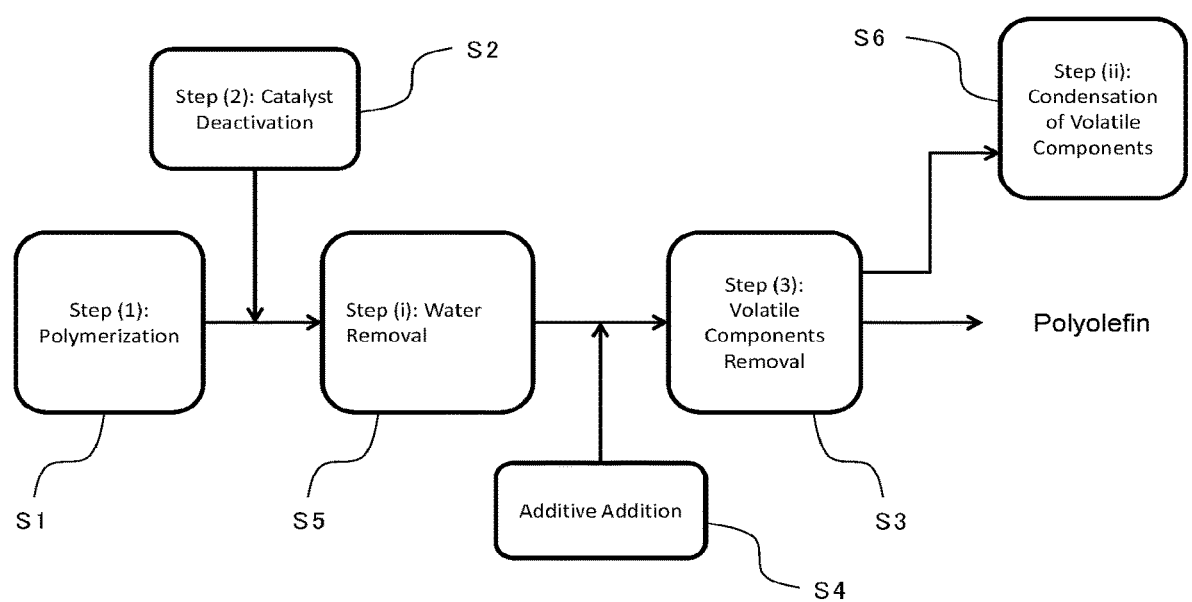

METHOD FOR PRODUCING POLYOLEFIN

TECHNICAL FIELD

The present invention relates to a method for producing a polyolefin, and specifically to a method for producing a polyolefin mixed with an antioxidant.

BACKGROUND ART

A liquid-phase polymerization method is widely employed as a method for producing a polyolefin (for example, see PTLs 1 and 2). According to the liquid-phase polymerization method, a liquid monomer, and as the case may be, a polymerizing olefin, and an inert hydrocarbon solvent are included. The inert hydrocarbon solvent can be used for promoting the solubility of the polymer obtained in the liquid medium. In the liquid-phase polymerization method, a catalyst and a liquid monomer or a monomer (olefin) dissolved in an organic solvent are fed into a polymerization reactor and polymerized in a liquid phase. The liquid phase is a mixture containing a polymer of the product (polyolefin), an unreacted monomer, an organic solvent when used, and a catalyst residue, and is therefore subjected to devolatilization for removing volatile components such as the unreacted monomer and the like from the mixture. Via the devolatilization step, a polymer in which the content of volatile components has been reduced can be obtained. In the case where the devolatilization is carried out in vacuum, a vacuum pump is connected to a devolatilization tank for pressure reduction, and between the devolatilization tank and the vacuum pump, a heat exchanger is arranged for recovering the devolatilized volatile components.

In general, an additive is mixed in a polymer for imparting specific properties to the polymer, and for example, an antioxidant is mixed in a polymer for preventing the polymer from being colored owing to oxidation degradation, or a flame retardant is mixed in a polymer for improving the flame retardancy of the polymer. PTL 1 describes mixing a polymer with an additive such as an antioxidant or the like, using a static mixer arranged downstream the final evaporator.

However, according to the method described in PTL 1, the polymer at the outlet of the polymerization reactor and the finally obtained polymer may greatly differ in the physical properties such as the melt index, the yellow index, the molecular weight distribution and others thereof. This is because in the final evaporator, the apparatus is driven in vacuum and therefore air may come in the evaporator so that oxygen may be brought into contact with and may react with the polymer chain.

For solving the problem, in the method described in PTL 2, before or simultaneously with separation of the polymer from the unreacted monomer which is performed by treating the polymer solution in a volatile removing step, an antioxidant is added to the polymer solution.

CITATION LIST

Patent Literature

PTL 1: JP 2005-530915 A
PTL 2: JP 2012-511590 A

SUMMARY OF INVENTION

Technical Problem

However, in the method described in PTL 2, when the fluid discharged out in evacuating the final evaporator via a vacuum pump is led to pass through the heat exchanger, the heat exchanger may be clogged so that the pressure in the final evaporator may increase. In such a case, the heat exchanger must be shut down and must be cleaned up, and therefore continuous operation is difficult.

Accordingly, an object of the present invention is to provide a method for continuously and stably producing a polyolefin while preventing heat exchanger clogging.

Solution to Problem

The present inventors have assiduously studied and, as a result, have found that, owing to water added for catalyst deactivation after polymerization as well as water originally existing in a polymer solution, the added antioxidant is hydrolyzed to give a hydrolysate, and the hydrolysate evaporates along with volatile components in the devolatilization step so that, in cooling the volatile components containing the hydrolysate in a heat exchanger, the hydrolysate may crystallize in the heat exchanger to clog the heat exchanger. The present inventors have further assiduously studied and, as a result, have found that, by adding an additive when the water concentration in the polymer solution before the step of removing the volatile components is 3 ppm by mass or less, the additive can be prevented from being hydrolyzed and the heat exchanger can be thereby prevented from being clogged with the hydrolysate of the additive. The present invention has been completed on the basis of these findings.

According to the present invention, there can be provided a method for producing a polyolefin as mentioned below.

<1> A method for producing a polyolefin, including:
(1) a step (1) of polymerizing one or more olefins in solution polymerization or slurry polymerization in the presence of a polymerization catalyst to produce a polymer solution,
(2) a step (2) of taking out the polymer solution obtained in the step (1), and adding a catalyst deactivator in the polymer solution to deactivate the polymerization catalyst, and
(3) a step (3) of removing volatile components in vacuum from the polymer solution where the polymerization catalyst has been deactivated;
and including, between the step (2) and the step (3), a step of adding an additive to the polymer solution when the water concentration in the polymer solution is 3 ppm by mass or less.
<2> The method for producing a polyolefin according to the above <1>, including a step (i) of removing water such that the water concentration in the polymer solution becomes 3 ppm by mass or less, between the step (2) and the step (3).
<3> The method for producing a polyolefin according to the above <2>, wherein the step (i) is carried out at 200 to 250° C. and at 80 to 130 kPa.
<4> The method for producing a polyolefin according to the above <2> or <3>, wherein an additive is added between the step (i) and the step (3).
<5> The method for producing a polyolefin according to any one of the above <1> to <4>, including a step (ii) of condensing the volatile components removed in the step (3), by a heat exchanger.

<6> The method for producing a polyolefin according to the above <5>, wherein the heat exchanger has a demister thereinside.
<7> The method for producing a polyolefin according to any one of the above <1> to <6>, wherein the step (3) is carried out at 230 to 250° C.
<8> The method for producing a polyolefin according to any one of the above <1> to <7>, wherein the catalyst deactivator is water.
<9> The method for producing a polyolefin according to any one of the above <1> to <8>, wherein the additive is an antioxidant.
<10> The method for producing a polyolefin according to any one of the above <1> to <9>, wherein, in the step (1), the olefin dissolved in an organic solvent is polymerized.
<11> The method for producing a polyolefin according to the above <10>, wherein the concentration of the organic solvent in the polymer solution before the step (3) is 1% by mass or more.

Advantageous Effects of Invention

According to the method of the present invention, a polyolefin can be produced continuously and stably for a long period of time while preventing polymer coloration and preventing heat exchanger clogging. In the case where the additive is an antioxidant, hydrolysis of the antioxidant can be prevented with preventing polymer coloration, and a polyolefin can be produced continuously and stably for a long period of time while preventing the heat exchanger from being clogged with a decomposition product of the antioxidant.

BRIEF DESCRIPTION OF DRAWING

FIG. 1 is a flowchart showing an outline of one preferred embodiment of a polyolefin production method of the present invention.

DESCRIPTION OF EMBODIMENTS

The present invention is described hereinunder. In this description, the term relating to numerical value expression, "A to B" means "A or more and B or less" (in the case of A<B) or "A or less and B or more" (in the case of A>B). In the present invention, a combination of preferred embodiments is a more preferred embodiment.

A method for producing a polyolefin of the present invention includes the following steps (1) to (3):

(1) a step (1) of polymerizing one or more olefins in solution polymerization or slurry polymerization in the presence of a polymerization catalyst to produce a polymer solution, (2) a step (2) of taking out the polymer solution obtained in the step (1), and adding a catalyst deactivator in the polymer solution to deactivate the polymerization catalyst, and (3) a step (3) of removing volatile components in vacuum from the polymer solution where the polymerization catalyst has been deactivated.

(Step (1): Polymerization Step)

The step (1) is a step of polymerizing one or more olefins in solution polymerization or slurry polymerization in the presence of a polymerization catalyst to produce a polymer solution.

The polyolefin to be produced according to the method of the present invention is, though not specifically limited thereto, preferably a propylenic polymer. Examples of the propylenic polymer include (i) a propylene homopolymer obtained through homopolymerization of propylene, and (ii) a propylenic copolymer obtained through copolymerization of propylene; and ethylene and/or an α-olefin having 4 to 20 carbon atoms, and a propylene homopolymer is especially preferred.

Examples of the other α-olefin than propylene to constitute the propylenic copolymer includes ethylene, 1-butene, 1-pentene, 4-methyl-1-pentene, 1-hexene, 1-octene, 1-decene, 1-dodecene, 1-tetradecene, 1-hexadecene, 1-octadecene, 1-eicosene, etc., and among these, one or two or more can be used.

The propylenic copolymer in the present invention is preferably a random copolymer. From the viewpoint of transparency, the structural unit obtained from propylene is preferably 90 mol % or more, and more preferably 95 mol % or more.

The polymerization catalyst to be used in the method of the present invention may be any one usable in olefin polymerization with no specific limitation, and examples thereof include a Ziegler-Natta catalyst, a metallocene catalyst, etc. The metallocene catalyst includes a transition metal compound with one or two ligands of a cyclopentadienyl group, a substituted cyclopentadienyl group, an indenyl group, a substituted indenyl group and the like, as described in JP 58-19309 A, JP 61-130314 A, JP 3-163088 A, JP 4-300887 A, JP 4-211694 A, JP 1-502036 A, etc., and a catalyst obtained by combining a transition metal compound having those ligands geometrically controlled and a promoter. The polymerization catalyst may be used by combining the main catalyst with a carrier or a promoter.

The polymerization method to be used in the method of the present invention is solution polymerization or slurry polymerization. From the viewpoint of easy reaction control, solution polymerization is preferred. In solution polymerization, a liquid olefin or an olefin dissolved in an organic solvent is polymerized in a liquid phase in the presence of a catalyst. From the viewpoint of enhancing the solubility of the resultant polymer in the liquid medium, use of an olefin dissolved in an organic solvent is preferred.

Though not specifically limited, the liquid olefin is an olefin that is liquid at room temperature, and is preferably a linear α-olefin, for example, an α-olefin having 4 to 30 carbon atoms. Even such a liquid olefin may be dissolved in an organic solvent as described below.

Examples of the organic solvent include an aromatic hydrocarbon such as benzene, toluene, xylene, ethylbenzene, decalin, etc.; an alicyclic hydrocarbon such as cyclopentane, cyclohexane, methylcyclohexane, etc.; an aliphatic hydrocarbon such as pentane, hexane, heptane, octane, etc.; a halogenohydrocarbon such as chloroform, dichloromethane, etc. One alone or two or more of these may be used either singly or as combined. Among these, heptane is preferred.

Regarding the polymerization condition, the polymerization temperature is generally 50 to 120° C., preferably 50 to 100° C. The polymerization time is generally 0.5 hours to 2 hours, and the reaction pressure is preferably 0.5 to 3 MPa-G, more preferably 0.5 to 2.5 MPa-G, even more preferably 0.5 to 2 MPa-G. "-G" means a gauge pressure.

The molecular weight of the polyolefin may be adequately controlled by selecting the type of the catalyst component, the amount thereof to be used, and the polymerization temperature, and further by polymerization in the presence of hydrogen, etc.

(Step (2): Catalyst Deactivation Step)

The step (2) is a step of adding a catalyst deactivator to the polymer solution obtained in the step (1) to deactivate the polymerization catalyst. Owing to the step (2), reaction of the unreacted monomer can be prevented from occurring in the subsequent devolatilization step.

As the catalyst deactivator, any substance having a hydroxyl group can be used, and specific examples thereof include water and a low-boiling-point compound (for example, $CO_2$ and alcohol). Above all, from the viewpoint of product quality, water is preferred.

The amount of the catalyst deactivator to be added varies depending on the selected catalyst deactivator and the polymerization condition and therefore could not be specifically limited, but when water is selected as the catalyst deactivator, the amount thereof is generally 30 to 3,000 ppm by mass relative to the polymerization catalyst-containing polymer solution, preferably 100 to 2,000 ppm by mass. When the amount of water added falls within the range, the polymerization catalyst can be fully deactivated.

(Step (3): Volatile Components Removal Step)

The step (3) is a step of removing volatile components from the polymer solution obtained in the step (2). In the step (3), impurities can be removed from the polymer solution so that the residual solvent amount in the polymer product can be reduced and the physical properties of the polymer can be prevented from degrading, and in addition, the unreacted monomer can be recovered and reused.

The impurities to be removed as volatile components include an unreacted raw material (unreacted monomer), an oligomer having a low polymerization degree such as dimer, trimer, etc., an organic solvent, a catalyst residue and a catalyst deactivator.

Regarding the operating condition in the step (3), the step is carried out under the operating condition under which volatile components can be removed, and the pressure condition is a vacuum condition. In the case where an olefin dissolved in an organic solvent is polymerized in a solution phase, the organic solvent is removed from the resultant polymer solution.

The pressure condition is specifically 101.3 kPa-A or less, preferably 0 kPa-A or more and less than 101.3 kPa-A, more preferably 0 to 20.0 kPa-A. "-A" means an absolute pressure. In the absence of the suffix, pressure means an absolute pressure.

The temperature condition in the step (3) is not specifically limited so far as volatile components can be removed under the operating condition, but is preferably 200 to 250° C., more preferably 230 to 250° C.

(Additive)

For the purpose of imparting specific properties to the polyolefin to be produced, an additive is added to the polymer solution. The method of the present invention includes a step of adding an additive to the polymer solution when the water concentration in the polymer solution is 3 ppm by mass or less.

As described above, in a conventional method, the polymer is mixed with an additive such as an antioxidant or the like using a static mixer arranged downstream the devolatilization tank in the step (3) in the present invention (see PTL 1). However, the devolatilization tank is driven in vacuum and therefore a small amount of air may come in the devolatilization tank so that a small amount of oxygen may be brought into contact with and may react with the polymer chain, and as a result, the polymer immediately after polymerization and the polymer to be obtained finally may often greatly differ in point of the physical properties thereof such as the melt index, the yellow index, the molecular weight distribution, etc.

On the other hand, in the case where the polymer solution is brought into contact with an antioxidant inside the devolatilization tank in the upstream step of the devolatilization tank, or the polymer solution is brought into contact with an additive such as an antioxidant or the like further upstream the devolatilization tank in the upstream step of the devolatilization tank, as described in PTL 2, the heat exchanger for cooling the organic solvent and others devolatilized in the devolatilization tank would be clogged to increase the pressure in the devolatilization tank.

The present inventors have found that, in the polymer solution, water added for catalyst deactivation or water originally existing in the polymer solution exists in an amount of a few ppm, and have found that, owing to the water, the additive such as antioxidant or the like is hydrolyzed and the resultant product of hydrolysis is devolatilized and cooled by the heat exchanger and is thereby crystallized to cause clogging of the heat exchanger.

Accordingly, in the present invention, an additive is added to the polymer solution when the water concentration in the polymer solution is 3 ppm by mass or less, preferably 1 ppm by mass or less, more preferably 0.1 ppm by mass or less, and even more preferably 0.05 ppm by mass or less. Consequently, the risk of additive hydrolysis is reduced to prevent heat exchanger clogging, and therefore a polyolefin can be produced continuously and stably for a long period of time. In addition, since additive hydrolysis can be prevented, the additive can exhibit the additive effect intrinsic thereto.

When water is used as the catalyst deactivator, preferably, the step of adding an additive is carried out between the step (i) and the step (3) to be mentioned below. Since the step (3) is carried out in vacuum, a small amount of oxygen may have some negative influence on polymer, and therefore an additive is preferably added before the step (3). On the other hand, the water concentration in the polymer solution to be obtained in the step (i) is preferably 3 ppm by mass or less, and therefore from the viewpoint of preventing additive hydrolysis, preferably, an additive is added after the step (i).

The additive includes an antioxidant, a neutralizing agent, a slip agent, an antiblocking agent, an antifogging agent, an antistatic agent, etc. One alone or two or more of these additives may be used either singly or as combined.

The additive is, from the viewpoint of preventing polymer properties change in the step (3), preferably an antioxidant, and the antioxidant is preferably a phenol-based antioxidant or a phosphorus-containing antioxidant.

Specific examples of the phenol-based antioxidant include 2,6-di-t-butyl-4-methylphenol, n-octadecyl-3-(3',5'-di-t-butyl-4'-hydroxyphenyl) propionate, tetrakis[methylene-3-(3,5-di-t-butyl-4-hydroxyphenyl)propionate]methane, tris(3,5-di-t-butyl-4-hydroxybenzyl) isocyanurate, 4,4'-butylidenebis-(3-methyl-6-t-butylphenol), triethylene glycol-bis[3-(3-t-butyl-4-hydroxy-5-methylphenyl) propionate, 3,9-bis-{2-[3-(3-t-butyl-4-hydroxy-5-methylphenyl) propionyloxy]-1,1-dimethylethyl}-2,4,8,10-tetraoxaspiro[5,5]undecane, etc.

Commercial products of the phenol-based antioxidant include Irganox 245, Irganox 1010, Irganox 1076, Irganox 3114 (all manufactured by BASF), Sumilizer BBM-S, Sumilizer BHT, Sumilizer BP-101, Sumilizer GA-80 (all produced by Sumitomo Chemical Co., Ltd.), Adekastab AO-20, Adekastab AO-40, Adekastab AO-60, Adekastab AO-70, Adekastab AO-80 (all manufactured by Adeka Corporation), Yoshinox BB, Yoshinox BHT, Tominox 917, Tominox TT (all manufactured by Yoshitomi Pharmaceutical Industries, Ltd.), Antage BHT, Antage W-300 (both by Kawaguchi Chemical Industry Co., Ltd.), TTHP (manufactured by Toray Industries, Inc.) (all trade names), etc.

Specific examples of the phosphorus-containing antioxidant include trisnonylphenyl phosphite, tris(2,4-di-t-butylphenyl) phosphite, distearyl pentaerythritol diphosphite, bis(2,4-di-t-butylphenyl)pentaerythritol phosphite, bis(2,6-di-t-butyl-4-methylphenyl)pentaerythritol phosphite, 2,2-methylenebis(4,6-di-t-butylphenyl)octyl phosphite, tetrakis(2,4-di-t-butylphenyl)-4,4-biphenylene-diphosphonite, etc.

Commercial products of the phosphorus-containing antioxidant include Irgafos 168 (manufactured by BASF), Sumilizer GP, Sumilizer TNP (both manufactured by Sumitomo Chemical Co., Ltd.), Adekastab 1178, Adekastab 2112, Adekastab HP-10, Adekastab PEP-24G, Adekastab PEP-36 (all manufactured by Adeka Corporation), JP-135, JPP-2000 (both manufactured by Johoku Chemical Co., Ltd.), Weston 618 (manufactured by GE), Sandstab P-EPQ (manufactured by Sandoz) (all trade names), etc.

The polyolefin production method of the present invention preferably includes the following step (i). In particular, in the case where water is used as the catalyst deactivator, the method must include the following step (i).

In addition, in the case where the volatile components removed in the step (3) are cooled and recovered, the method preferably includes the following step (ii).

(Step (i): Water Removal Step)

The step (i) is provided between the step (2) and the step (3), and is a step of removing water from the polymer solution obtained in the step (1) or from the polymer solution obtained in the step (2) where water is used as the catalyst deactivator, thereby reducing the water concentration in the polymer solution to 3 ppm by mass or less.

From the viewpoint of preventing additive hydrolysis, the water concentration in the polymer solution to be obtained in the step (i) is preferably 3 ppm by mass or less, more preferably 1 ppm by mass or less, even more preferably 0.1 ppm by mass or less, and still more preferably 0.05 ppm by mass or less.

The operating condition in the step (i) is not specifically limited so far as water can be removed from the polymer solution under the operating condition to have the water concentration as mentioned above, but the temperature condition is preferably 180 to 280° C., more preferably 200 to 280° C., even more preferably 220 to 250° C. The pressure condition is preferably 70 to 130 kPa-A, more preferably 80 to 120 kPa-A, even more preferably 85 to 120 kPa-A.

(Step (ii): Cooling Step)

The step (ii) is a step of cooling and liquefying the volatile components removed in the step (3) by the use of a heat exchanger.

In general, a vacuum pump is connected to the devolatilization tank to be driven in vacuum, for reducing the pressure in the devolatilization tank. In order to maintain a vacuum state in the devolatilization tank, the volatile components devolatilized in the devolatilization tank must be cooled and recovered, and a heat exchanger is arranged between the devolatilization tank and the vacuum pump.

In the case where the above-mentioned additive is added to the polymer solution obtained in the step (1), additive hydrolysis occurs. The volatile components in the polymer solution containing the additive hydrolysate are removed in the step (3), and in the case where the step (3) is operated in vacuum, a step of cooling the volatile components by the use of a heat exchanger is necessary as mentioned above. The removed additive hydrolysate is crystallized by the heat exchanger and the heat exchanger is thereby gradually clogged and, if so, the devolatilization tank could no more maintain a vacuum state therein.

In the present invention, the above-mentioned additive is added in the state where the water concentration in the polymer solution is 3 ppm by mass or less to thereby prevent heat exchanger clogging to be caused by hydrolysate crystallization so that the vacuum state in the devolatilization tank can be kept as such for a long period of time and a polyolefin can be therefore produced continuously and stably for a long period of time.

In addition, in the step (3), the splashing and accompanying polymer is cooled and condensed in the heat exchanger to clog the heat exchanger, and therefore for preventing clogging, a demister is preferably arranged inside the heat exchanger.

When the heat exchanger has a demister, the splashing and accompanying polymer can be separated and removed from the volatile components in the step (3). As a result, the splashing and accompanying polymer is hardly brought into contact with the cooling area inside the heat exchanger and the heat exchanger can be thereby prevented from clogging. From the above-mentioned viewpoints, the demister is preferably arranged at the inlet port in the heat exchanger. The type of the demister is not specifically limited, and a mesh demister, a wire demister and the like may be used.

In the polyolefin production method of the present invention where an olefin dissolved in an organic solvent is polymerized to give a polymer solution and where the concentration of the organic solvent in the polymer solution upstream the step (3) is 1% by mass or more, oxygen may react with the polymer chain in the step (3) to reduce the change in the physical properties between the polymer immediately after the polymerization and the polymer to be obtained finally, and therefore in the case, the amount of the additive to be used may be reduced to prevent heat exchanger clogging. From this viewpoint, the concentration of the organic solvent in the polymer solution before the step (3) is preferably 1% by mass or more, more preferably 2% by mass or more and even more preferably 3% by mass or more. The upper limit of the concentration of the organic solvent in the polymer solution is preferably 5% by mass or less.

From the viewpoint of producing a high-purity polyolefin, the volatile component concentration in the polymer solution obtained in the step (3) is preferably 1,500 ppm by mass or less, more preferably 1,000 ppm by mass or less, and even more preferably 500 ppm by mass or less.

One preferred embodiment of the present invention is described below with reference to the drawing attached hereto, but the present invention is not limited thereto. FIG. 1 is a flowchart showing an outline of one preferred embodiment of the polyolefin production method of the present invention.

In the present invention, first in the polymerization tank, one or more olefins are polymerized in solution polymerization or slurry polymerization in the presence of a polymerization catalyst to produce a polymer solution (step (1), S1). In the step (1), an olefin dissolved in an organic solvent may be polymerized. Next, the polymer solution is taken out of the polymerization tank, a catalyst deactivator is added to the polymer solution to deactivate the polymerization catalyst (step (2), S2). As the catalyst deactivator, water is preferred.

In the preferred embodiment, after the step (2), water is removed from the polymer solution obtained in the step (1) or from the polymer solution obtained using water as the catalyst deactivator in the step (2) to reduce the water concentration in the polymer solution to be 3 ppm by mass or less (step (i), S5). Preferably, the step (i) is carried out under a condition at 180 to 280° C. and at 70 to 130 kPa-A. In the step (i), a part of volatile components may be removed.

After the step (i) and before the step (3), an additive is added to the polymer solution when the water concentration in the polymer solution is 3 ppm by mass or less (S4). As the additive, an antioxidant is preferred.

Next, volatile components are removed in vacuum from the polymer solution where the polymerization catalyst has been deactivated (step (3), S3). Impurities are removed from the polymer solution to reduce the residual solvent amount in the polymer, and a polymer whose physical properties are prevented from being worsened is produced. The impurities to be removed as volatile components include an unreacted raw material (unreacted monomer), an oligomer having a low polymerization degree such as dimer, trimer, etc., an organic solvent, a catalyst residue and a catalyst deactivator, and these may be recovered and reused. The polymer from which volatile components have been removed is thereafter collected as a product after a granulation step, etc.

In the preferred embodiment, the volatile components removed in the step (3) are cooled and liquefied by a heat exchanger (step (ii), S6). Preferably, the heat exchanger has a demister thereinside.

In the present invention, an additive is added in a state where the water concentration in the polymer solution is 3 ppm by mass or less so that the heat exchanger can be prevented from being clogged by crystallization of a hydrolysate of the additive, and the vacuum state inside the devolatilization tank can be kept for a long period of time, and a polyolefin can be produced continuously and stably for a long period of time.

EXAMPLES

Next, the present invention is described in more detail with reference to Examples, but by which, however, the present invention is not whatsoever restricted at all.

Example 1

<Step (1)>
n-Heptane was fed into a reactor equipped with a stirrer at a flow rate of 5,200 L/hr, and along with this, a polymerization catalyst component obtained through previous contact of triisobutylaluminum, dimethylanilinium tetrakispentafluorophenyl borate, (1,2'-dimethylsilylene)(2,1'-dimethylsilylene)-bis(3-trimethylsilylmethylindenyl) zirconium dichloride, and triisobutylaluminum with propylene was fed thereinto, and polymerization was carried out at a polymerization temperature of 85° C. and under a total pressure inside the reactor of 1.7 MPa-G.

<Step (2)>
Water as a catalyst deactivator was added to the polymer solution obtained in the step (1) to deactivate the polymerization catalyst.

<Step (i)>
The polymer solution obtained in the step (2), in which the polymerization catalyst had been deactivated, was transferred into a devolatilization tank, which was driven at a temperature of 225° C. and a pressure of 97 kPa-A, and the volatile components (n-heptane, unreacted raw material, water) were removed from the polymer solution.

<Step of Adding Additive>
The polymer solution from which the volatile components had been removed was discharged out of the devolatilization tank in the step (i), and before the discharged polymer solution was transferred into a devolatilization tank in the step (3), a phosphorus-containing antioxidant as an antioxidant was added to the polymer solution so as to be 500 to 1,000 ppm by mass.

<Step (3)>
The polymer solution added with the antioxidant was transferred into a devolatilization tank, which was driven at a temperature of 248° C. and a pressure of 0.65 kPa-A to remove the volatile components (n-heptane, water) from the polymer solution to produce polypropylene.

The water concentration in the polymer solution after the step (i) was calculated from the operating condition in the step (i) through vapor-liquid equilibrium calculation. At this time, the water concentration was 0.02 ppm by mass. This indicates the water concentration in the polymer solution at the time when the antioxidant was added to the polymer solution.

From the n-heptane amount stored in the vessel and the total amount of the polymer solution obtained in the step (1), the n-heptane concentration in the polymer solution after the step (i) was calculated and was 4% by mass.

The polymer production amount at the time when the pressure inside the devolatilization tank in the step (3) increased to break down continuous operation is shown in Table 1.

Example 2

Polypropylene was produced in the same manner as in Example 1 except that a phenol-based antioxidant was used as an antioxidant in place of the phosphorus-containing antioxidant.

Comparative Example 1

Polypropylene was produced in the same manner as in Example 1 except that the operating condition in the step (i) was changed to a temperature of 188° C. and a pressure of 700 kPa-A.

The volatile components removed in the step (3) were discharged out from the upper part of the devolatilization tank, and cooled and liquefied by the heat exchanger arranged between the devolatilization tank and the vacuum pump, and stored in the vessel. First, assuming that water was dissolved in saturation in the n-heptane stored in the vessel, and based on the solubility of water in n-heptane, the water amount was calculated from the n-heptane amount stored in the vessel. The resultant water amount was added to the amount of free water standing in the boot part arranged in the vessel to calculate the total water amount. From the total water amount and the total polymer solution amount obtained in the step (1), the water concentration in the polymer solution was calculated, and the water concentration in the polymer solution after the step (i) was 5 ppm by mass. The n-heptane concentration in the polymer solution after the step (i) was 16% by mass.

Comparative Example 2

Polypropylene was produced in the same manner as in Comparative Example 1 except that the operating condition in the step (i) was changed to a temperature of 180° C. and a pressure of 700 kPa-A, and a phenol-based antioxidant was used as an antioxidant in place of the phosphorus-containing antioxidant.

The water concentration in the polymer solution after the step (i) was 5 ppm by mass. The n-heptane concentration in the polymer solution after the step (i) was 19% by mass.

TABLE 1

|  | Example 1 | Example 2 | Comparative Example 1 | Comparative Example 2 |
| --- | --- | --- | --- | --- |
| Kind of Antioxidant | Phosphorus-containing Antioxidant | Phenol-based Antioxidant | Phosphorus-containing Antioxidant | Phenol-based Antioxidant |
| Concentration of Antioxidant added to polymer solution | 500 to 1,000 ppm | 500 to 1,000 ppm | 500 to 1,000 ppm | 500 to 1,000 ppm |
| Water Concentration in polymer solution at antioxidant addition | 0.02 mass ppm | 0.02 mass ppm | 5 mass ppm | 5 mass ppm |
| n-Heptane Concentration in polymer solution before step (3) | 4 mass % | 4 mass % | 16 mass % | 19 mass % |
| Temperature of Polymer Solution at antioxidant addition | 210° C. | 215° C. | 185° C. | 180° C. |
| Pressure in Devolatilization Tank in step (3) | 0.65 kPa | 0.65 kPa | 0.65 kPa | 0.65 kPa |
| Polymer Production Amount before failure in continuous operation owing to operation pressure increase in devolatilization tank | 2,400 ton or more | 1,400 ton or more | 150 ton | 650 ton |

In Comparative Examples 1 and 2 where the antioxidant was added when the water concentration in the polymer solution was 5 ppm by mass, the heat exchanger clogged and the pressure in the devolatilization tank increased, and therefore polypropylene was continuously produced in an amount of only up to 150 tons and 650 tons, respectively.

As opposed to these, in Examples 1 and 2 where the antioxidant was added when the water concentration in the polymer solution was 0.02 ppm by mass, polypropylene was continuously produced in an amount of 2,400 tons or more and 1,400 tons or more, respectively.

INDUSTRIAL APPLICABILITY

According to the method of the present invention, a polyolefin can be produced continuously and stably for a long period of time while preventing polymer coloration and heat exchanger clogging.

REFERENCE SIGNS LIST

S1 Step (1): Polymerization Step
S2 Step (2): Catalyst Deactivation Step
S3 Step (3): Volatile Components Removal Step
S4 Step of Adding Additive
S5 Step (i): Water Removal Step
S6 Step (ii): Condensation Step

The invention claimed is:

1. A method for producing a polyolefin, the method comprising:
   (1) polymerizing one or more olefins in solution polymerization or slurry polymerization in the presence of a polymerization catalyst to produce a polymer solution;
   (2) adding a catalyst deactivator in the polymer solution obtained in (1) to deactivate the polymerization catalyst; and
   (3) removing volatile components in vacuum from the polymer solution where the polymerization catalyst has been deactivated; and
   (i) removing water such that a water concentration in the polymer solution becomes 3 ppm by mass or less between (2) and (3), and adding an additive to the polymer solution in which the water concentration in the polymer solution is 3 ppm by mass or less.

2. The method for producing a polyolefin according to claim 1, wherein the removing (i) is carried out at 200 to 250° C. and at 80 to 130 kPa.

3. The method for producing a polyolefin according to claim 1, comprising:
   (ii) condensing the volatile components removed in (3), by a heat exchanger.

4. The method for producing a polyolefin according to claim 3, wherein the heat exchanger has a demister thereinside.

5. The method for producing a polyolefin according to claim 1, wherein the removing (3) is carried out at 230 to 250° C.

6. The method for producing a polyolefin according to claim 1, wherein the catalyst deactivator is water.

7. The method for producing a polyolefin according to claim 1, wherein the additive is an antioxidant.

8. The method for producing a polyolefin according to claim 1, wherein, in the polymerizing (1), olefin dissolved in an organic solvent is polymerized.

9. The method for producing a polyolefin according to claim 8, wherein a concentration of the organic solvent in the polymer solution before the removing (3) is 1% by mass or more.

* * * * *